US009593226B2

(12) United States Patent
Cambon et al.

(10) Patent No.: US 9,593,226 B2
(45) Date of Patent: Mar. 14, 2017

(54) COMPOSITION CONTAINING A PARTICULAR DIENE ELASTOMER AND A CARBON BLACK HAVING A PARTICULAR SPECIFIC SURFACE AREA

(75) Inventors: Stéphanie Cambon, Clermont-Ferrand (FR); Damien Thomasson, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 416 days.

(21) Appl. No.: 13/989,167

(22) PCT Filed: Nov. 23, 2011

(86) PCT No.: PCT/EP2011/070743
§ 371 (c)(1),
(2), (4) Date: Jun. 11, 2013

(87) PCT Pub. No.: WO2012/069507
PCT Pub. Date: May 31, 2012

(65) Prior Publication Data
US 2013/0245186 A1  Sep. 19, 2013

(30) Foreign Application Priority Data

Nov. 23, 2010 (FR) ...................................... 10 59642

(51) Int. Cl.
C08L 15/00 (2006.01)
C08K 3/04 (2006.01)
C08C 19/00 (2006.01)
B60C 1/00 (2006.01)
C08C 19/44 (2006.01)
C08L 7/00 (2006.01)
C08L 9/00 (2006.01)
C08L 21/00 (2006.01)

(52) U.S. Cl.
CPC .............. *C08K 3/04* (2013.01); *B60C 1/0016* (2013.04); *C08C 19/44* (2013.01); *C08L 15/00* (2013.01); *C08L 7/00* (2013.01); *C08L 9/00* (2013.01); *C08L 21/00* (2013.01)

(58) Field of Classification Search
CPC ............ C08K 3/04; C08L 15/00; C08C 19/00
USPC ................................................. 524/496, 572
See application file for complete search history.

(56) References Cited

U.S. PATENT DOCUMENTS

| 5,248,722 | A | * | 9/1993 | DeTrano et al. .............. 524/496 |
| 5,430,088 | A | | 7/1995 | Ohashi et al. |
| 5,512,626 | A | | 4/1996 | Matsuo et al. |
| 6,774,255 | B1 | | 8/2004 | Tardivat et al. |
| 2002/0179218 | A1 | * | 12/2002 | Pierre et al. .................. 152/564 |
| 2004/0051210 | A1 | | 3/2004 | Tardivat et al. |
| 2004/0132880 | A1 | | 7/2004 | Durel et al. |
| 2005/0016650 | A1 | | 1/2005 | Durel et al. |
| 2005/0016651 | A1 | | 1/2005 | Durel et al. |
| 2007/0066744 | A1 | | 3/2007 | Weydert et al. |

FOREIGN PATENT DOCUMENTS

| EP | 0 501 227 A1 | 9/1992 |
| EP | 0 608 892 A1 | 8/1994 |
| EP | 0 647 675 A1 | 4/1995 |
| EP | 0 735 088 A1 | 10/1996 |
| EP | 0 810 258 A1 | 12/1997 |
| EP | 0 924 227 A1 | 6/1999 |
| EP | 1 278 779 A1 | 1/2003 |
| EP | 1 767 571 A1 | 3/2007 |
| WO | WO 97/36724 A2 | 10/1997 |
| WO | WO 99/16600 A1 | 4/1999 |
| WO | WO 00/05300 A1 | 2/2000 |
| WO | WO 00/05301 A1 | 2/2000 |
| WO | WO 02/10269 A2 | 2/2002 |
| WO | WO 02/30939 A1 | 4/2002 |
| WO | WO 02/31041 A1 | 4/2002 |
| WO | WO 02/083782 A1 | 10/2002 |

(Continued)

OTHER PUBLICATIONS

Ash et al. (Handbook of Filler, Extenders and Diluents, 2nd Ed., Synapse Info Resources, 2007, p. 49).*
International Search Report (PCT/ISA/210) issued on Feb. 29, 2012, by the European Patent Office as the International Searching Authority for International Application No. PCT/EP2011/070743.

*Primary Examiner* — Ling Choi
*Assistant Examiner* — Ronald Grinsted
(74) *Attorney, Agent, or Firm* — Dickinson Wright PLLC

(57) ABSTRACT

The invention relates to a rubber composition based on one or more specific functionalized diene elastomers and on one or more carbon blacks with a CTAB specific surface varying from 100 to 200 m$^2$/g, the functionalized diene elastomer or elastomers being composed of a specific diene elastomer functionalized, at the chain end or in the middle of the chain, by a tin functional group and of a content of less than 15% by weight, with respect to the total weight of the functionalized diene elastomer, of a non-tin functional elastomer. The diene elastomer exhibits a monomodal distribution of molecular weights before functionalization and a polydispersity index before functionalization of less than or equal to 1.3. This composition makes it possible to obtain tires having an improved wear resistance and which are characterized by decrease in rolling resistance, without damaging the processing and the wet grip.

20 Claims, No Drawings

(56) References Cited

FOREIGN PATENT DOCUMENTS

| WO | WO 03/002648 A1 | 1/2003 |
| WO | WO 03/002649 A1 | 1/2003 |
| WO | WO 03/016837 A1 | 2/2003 |
| WO | WO 2006/069792 A1 | 7/2006 |
| WO | WO 2006/069793 A1 | 7/2006 |
| WO | WO 2006/125532 A1 | 11/2006 |
| WO | WO 2006/125533 A1 | 11/2006 |
| WO | WO 2006/125534 A1 | 11/2006 |

* cited by examiner

COMPOSITION CONTAINING A PARTICULAR DIENE ELASTOMER AND A CARBON BLACK HAVING A PARTICULAR SPECIFIC SURFACE AREA

BACKGROUND

Field

The present invention relates to a rubber composition based on one or more functionalized diene elastomers and on one or more carbon blacks with a particular CTAB specific surface, and to a semi-finished article comprising it, and to a tire incorporating such a semi-finished article.

Description of Related Art

Now that savings in fuel and the need to protect the environment have become a priority, it is desirable to produce mixtures having good wear resistance properties while having a hysteresis which is as low as possible in order to be able to process them in the form of rubber compositions which can be used in the manufacture of various semi-finished products participating in the composition of tire casings, such as, for example, underlayers, sidewalls or treads, in order to obtain tires having an improved wear resistance without damaging the rolling resistance. Safety during braking on a wet surface is also a result which has to be maintained. Finally, productivity constraints are also resulting in the need not to be disadvantageous to, indeed even to improve, the processing of the mixtures.

It is known, for example from the document EP 924 227, that the use of synthetic elastomers characterized by a monomodal distribution of the molecular weights and by a polydispersity index (defined as the ratio of the weight-average molecular weight Mw to the number-average molecular weight Mn) of greater than 2 is disadvantageous to the hysteresis of the mixtures.

It is also known, from the document EP 1 278 779, that the presence of polyisoprene blocks at the chain end in the polymers described, confers, on the rubber compositions in which they are present, a reduced hysteresis and an undamaged processability.

It is also known, from the document EP 608 892, that the use of carbon black having a high specific surface makes it possible to improve the wear resistance of tires.

SUMMARY

There thus exists a need to provide a rubber composition which makes it possible to obtain tires having an improved wear resistance and which are characterized by a decrease in the rolling resistance, without damaging the processing and the wet grip.

The Applicant has discovered, surprisingly, that a rubber composition based on one or more functionalized diene elastomers and on one or more carbon blacks with a CTAB specific surface (measured according to Standard NFT 45-007, November 1987, method B) varying from 100 to 200 m²/g, the said functionalized diene elastomer or elastomers being composed of a specific diene elastomer functionalized, at the chain end or in the middle of the chain, by a tin functional group and of a content of less than 15% by weight, with respect to the total weight of the functionalized diene elastomer, of a specific non-tin-functional elastomer makes it possible to achieve these objectives.

A subject-matter of the invention is thus a rubber composition based on one or more functionalized diene elastomers and on one or more carbon blacks with a CTAB specific surface varying from 100 to 200 m²/g, preferably from 120 to 180 m²/g, the said functionalized diene elastomer or elastomers being composed:

a) of a diene elastomer functionalized, at the chain end or in the middle of the chain, by a tin functional group and corresponding to the following formula:

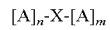

where n and m are integers of greater than or equal to 0, such that n+m=1 or 2, b) of a content of less than 15% by weight, with respect to the total weight of the functionalized diene elastomer, of a non-tin-functional elastomer corresponding to the following formula:

where:

A is a diene elastomer, the A blocks being identical to one another,

X is a tin-comprising group, the elastomer A exhibits a monomodal distribution of molecular weights before optional functionalization and a polydispersity index before optional functionalization of less than or equal to 1.3.

According to a preferred embodiment, the functionalized diene elastomer according to the invention comprises a diene elastomer star-branched by tin c) corresponding to the following formula:

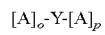

where:

o and p are integers of greater than or equal to 0 and such that o+p≥3 and o+p≤6, A is the diene elastomer as defined above, it being understood that it exhibits a monomodal distribution of molecular weights before star-branching and a polydispersity index before star-branching of less than or equal to 1.3, Y is a tin-comprising group.

DETAILED DESCRIPTION OF SPECIFIC EMBODIMENTS

Preferably, the functionalized diene elastomer according to the invention comprises from 5% to 45% by weight, preferably from 10% to 30% by weight, with respect to the total weight of the functionalized diene elastomer, of the said elastomer star-branched by tin c).

Preferably, the functionalized diene elastomer according to the invention comprises a content strictly of greater than 0% by weight and of less than 10% by weight, and more preferably a content of less than 5% by weight, with respect to the total weight of the functionalized diene elastomer, of the said non-tin-functional elastomer b).

The expression composition "based on" should be understood as meaning a composition comprising the mixture and/or the reaction product of the various constituents used, some of these base constituents being capable of reacting or intended to react with one another, at least in part, during the various phases of manufacture of the composition, in particular during the vulcanization thereof.

In the present description, functionalized diene elastomer is understood to mean a diene elastomer which comprises a group comprising one or more heteroatoms.

This group can be located at the chain end. It will then be said that the diene elastomer is functionalized at the chain end. It is generally an elastomer obtained by reaction of a living elastomer with a functionalization agent, that is to say any at least monofunctional molecule, the functional group being any type of chemical group known by a person skilled in the art to react with a living chain end.

This group can be located in the linear main elastomer chain. It will then be said that the diene elastomer is coupled or alternatively functionalized in the middle of the chain, in contrast to the position "at the chain end", although the group is not located precisely at the middle of the elastomer chain. It is generally an elastomer obtained by reaction of a living elastomer with a coupling agent, that is to say any at least difunctional molecule, the functional group being any type of chemical group known by a person skilled in the art to react with a living chain end.

This group can be central, to which n elastomer chains or branches (n>2) are bonded, forming a star-branched structure of the elastomer. It will then be said that the diene elastomer is n-arm star-branched. It is generally an elastomer obtained by reaction of a living elastomer with a star-branching agent, that is to say any polyfunctional molecule, the functional group being any type of chemical group known by a person skilled in the art to react with a living chain end.

The term "polydispersity index" is understood to mean, within the meaning of the invention, the weight-average molecular weight/number-average molecular weight ratio, the minimum theoretical value being 1.

As explained above, the diene elastomer a) is functionalized at the chain end or in the middle of the chain by a tin functional group. The functionalization can be obtained with a monohalotin or dihalotin functionalization agent which can correspond to the general formula $R_{4-x}SnX^0{}_x$, where x represents an integer having the value 1 or 2, R represents an alkyl, cycloalkyl, aryl, alkaryl or vinyl radical having from 1 to 12 carbon atoms, preferably a butyl, and $X^0$ is a halogen atom, preferably chlorine. Mention may be made, as preferred functionalization agent, of tributyltin monochloride or dibutyltin dichloride. In the same way, the functionalization can be obtained with a tin-derived functionalization agent which can correspond to the general formula $(X^1{}_yR^1{}_{3-y}Sn)-O-(SnR^1{}_{3-z}X^1{}_z)$ or $(X^1{}_yR^1{}_{3-y}Sn)-O-(CH_2)_e-O-(SnR^1{}_{3-z}X^1{}_z)$, where y and z represent integers between 0 and 2 and y+z is equal to 1 or 2, $R^1$ represents an alkyl, cycloalkyl, aryl, alkaryl or vinyl radical having from 1 to 12 carbon atoms, preferably a butyl, $X^1$ is a halogen atom, preferably chlorine, and e represents an integer from 1 to 20, preferably 4.

The diene elastomer c), when it is present, is star-branched by a tin functional group. The star-branching can be obtained with a tri- or tetrahalotin star-branching agent which can correspond to the general formula $R^2{}_qSnX^2{}_{4-q}$, where q represents an integer having the value 0 or 1, $R^2$ represents an alkyl, cycloalkyl, aryl, alkaryl or vinyl radical having from 1 to 12 carbon atoms, preferably a butyl, and $X^2$ is a halogen atom, preferably chlorine. Mention may be made, as preferred star-branching agent, of butyltin trichloride or tin tetrachloride. In the same way, the star-branching can be obtained with a tin-derived functionalization agent which can correspond to the general formula $(X^3{}_kR^3{}_{3-k}Sn)-O-(SnR^3{}_{3-l}X^3{}_l)$ or $(X^3{}_kR^3{}_{3-k}Sn)-O-(CH_2)_f-O-(SnR^3{}_{3-l}X^3{}_l)$, where k and l represent integers between 0 and 3 and k+l integers between 3 and 6, $R^3$ represents an alkyl, cycloalkyl, aryl, alkaryl or vinyl radical having from 1 to 12 carbon atoms, preferably a butyl, $X^3$ is a halogen atom, preferably chlorine, and f represents an integer having a value from 1 to 20, preferably 4.

According to a preferred embodiment, the diene elastomer a) is a diene elastomer functionalized by a tin functional group in the middle of the chain.

According to another preferred embodiment, the diene elastomer c) is a diene elastomer star-branched by tin having 4 branches.

According to another preferred embodiment, the diene elastomer a) is a diene elastomer functionalized by a tin functional group in the middle of the chain and the diene elastomer c) is a diene elastomer star-branched by tin having 4 branches.

According to the invention, the diene elastomer b) is non-tin-functional. The said elastomer can be obtained during the functionalization.

According to the invention, as explained above, the diene elastomer a) functionalized at the chain end or in the middle of the chain by a tin functional group exhibits a monomodal distribution of molecular weights before functionalization and a polydispersity index before functionalization of less than 1.3.

Likewise, as explained above, the star-branched diene elastomer c), when it is present, exhibits a monomodal distribution of molecular weights before star-branching and a polydispersity index before star-branching of less than 1.3.

Diene elastomer is understood to mean, according to the invention, any homopolymer obtained by polymerization of a conjugated diene monomer having from 4 to 12 carbon atoms or any block, random, sequential or microsequential copolymer obtained by copolymerization of one or more conjugated dienes with one another or with one or more vinylaromatic compounds having from 8 to 20 carbon atoms. In the case of copolymers, the latter comprise from 20% to 99% by weight of diene units and from 1% to 80% by weight of vinylaromatic units.

The following in particular are suitable as conjugated diene monomers which can be used in the process in accordance with the invention: 1,3-butadiene, 2-methyl-1,3-butadiene, 2,3-di($C_1$ to $C_5$alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, phenyl-1,3-butadiene, 1,3-pentadiene or 2,4-hexadiene.

The following in particular are suitable as vinylaromatic compounds: styrene, ortho-, meta- or para-methylstyrene, the "vinyltoluene" commercial mixture, para-(tert-butyl)styrene, methoxystyrenes, vinylmesitylene, divinylbenzene, vinylnaphthalene, and the like.

Preferably, the diene elastomer is chosen from polybutadienes, random or block butadiene/styrene copolymers, random or block butadiene/isoprene copolymers, random or block butadiene/styrene/isoprene copolymers, random or block styrene/isoprene copolymers and synthetic polyisoprene.

The following are suitable as such: polybutadienes, in particular those having a content (mol %) of 1,2-units of between 4% and 80%, polyisoprenes, butadiene/styrene copolymers and in particular those having a Tg (glass transition temperature (Tg, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers and especially those having an isoprene content of between 5% and 90% by weight and a Tg of −40° C. to −80° C., or isoprene/styrene copolymers and especially those having a styrene content of between 5% and 50% by weight and a Tg of between 5° C. and −55° C. In the case of butadiene/styrene/isoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −5° C. and −70° C., are suitable in particular.

According to a first specific embodiment, the diene elastomer [A]- can correspond to the following formula:

[B-C]- where:
the B block is composed of a polyisoprene or of a polybutadiene,
the C block is composed of a diene elastomer, the molar content of units resulting from conjugated dienes of which is greater than 15%,
the number-average molecular weight Mn1 of the B block varies from 2 500 to 20 000 g/mol,
the number-average molecular weight Mn2 of the C block varies from 80 000 to 350 000 g/mol,
the content of 1,2 linkages in the B block is between 1% and 20% in the case where B is a polybutadiene block,
the content of 3,4 linkages in each B block is between 1% and 25% in the case where B is a polyisoprene block,
the B-C copolymer exhibits a monomodal distribution of molecular weights before optional functionalization or optional star-branching and a polydispersity index before optional functionalization or optional star-branching of less than or equal to 1.3.

Preferably, the ratio of the number-average molecular weight Mn1 of each end polybutadiene or polyisoprene B block to the number-average molecular weight Mn2 of each of the C blocks varies from 5% to 20%.

Preferably, the C block or blocks are chosen from copolymers of styrene and butadiene, copolymers of styrene and isoprene, copolymers of butadiene and isoprene, styrene/butadiene/isoprene copolymers, polyisoprene when the neighbouring B block is a polybutadiene and polybutadiene when the neighbouring B block is a polyisoprene. More preferably, the C block or blocks are chosen from copolymers of styrene and butadiene.

According to a particularly preferred sub-embodiment, B is polyisoprene and C is a copolymer of styrene and butadiene, the block copolymer a) being functionalized by the functionalization agent dibutyltin dichloride ($Bu_2SnCl_2$) and the block copolymer c) being star-branched by the star-branching agent tin tetrachloride ($SnCl_4$).

According to another particularly preferred sub-embodiment, B is polybutadiene and C is a copolymer of styrene and butadiene, the block copolymer a) being functionalized by the functionalization agent dibutyltin dichloride ($Bu_2SnCl_2$) and the block copolymer c) being star-branched by the star-branching agent tin tetrachloride ($SnCl_4$).

According to a second specific embodiment of the invention, the diene elastomer a) can comprise an amine functional group at one or all of the ends of the chain not functionalized by tin. Likewise, the diene elastomer c) which may be present can comprise an amine functional group at the ends of the chains not star-branched by tin. Likewise, the non-tin-functional diene elastomer b) can comprise an amine functional group at one of the ends of the chain.

The polymerization of diene monomers is initiated by an initiator. Use may be made, as polymerization initiator, of any known monofunctional anionic initiator. However, an initiator comprising an alkali metal, such as lithium, is preferably used.

Those comprising a carbon-lithium bond are suitable in particular as organolithium initiators. Use will preferably be made of a hydrocarbon organolithium initiator not comprising a heteroatom. Representative compounds are aliphatic organolithium compounds, such as ethyllithium, n-butyllithium (n-BuLi) or isobutyllithium.

According to a specific embodiment of the invention, when the diene elastomer comprises an amine functional group at one or all of the ends of the chain, mention may also be made of organolithium compounds comprising a nitrogen-lithium bond, such as the compounds corresponding to the formula $Li(NR_1R_2)_a(NR_3)_b(R_4)_c$, in which $R_1$ and $R_2$ denote an alkyl, cycloalkyl or aryl radical comprising from 1 to 20 carbon atoms, $R_3$ denotes a branched or unbranched, cyclic alkyl radical comprising from 3 to 16 carbon atoms, $R_4$ denotes an alkyl, cycloalkyl or aryl radical comprising from 1 to 20 carbon atoms, and a, b and c are integers between 0 and 4, with the proviso that a+b+c=4 and a+b≥1.

The polymerization is, as known per se, preferably carried out in the presence of an inert solvent which can, for example, be an aliphatic or alicyclic hydrocarbon, such as pentane, hexane, heptane, isooctane or cyclohexane, or an aromatic hydrocarbon, such as benzene, toluene or xylene.

The polymerization can be carried out continuously or batchwise, preferably batchwise. The polymerization is generally carried out at a temperature of between 20° C. and 120° C. and preferably in the vicinity of 30° C. to 90° C. It is, of course, also possible to add, at the end of polymerization, a transmetallation agent for modifying the reactivity of the living chain end.

The living diene elastomer resulting from the polymerization is subsequently functionalized in order to prepare the functionalized diene elastomer according to the invention.

According to one method of preparation of the functionalized diene elastomer according to the invention when [A]-=[B-C]-, the block copolymer at the living chain end can be prepared in different stages:
the preparation of the living polyisoprene or polybutadiene end block, and
the preparation of the essentially unsaturated diene elastomer carried out in order to obtain the said block other than the polybutadiene or polyisoprene block.

According to this method of preparation, the polymerization of isoprene or butadiene diene monomers is initiated by the said organolithium initiators in order to obtain a living polyisoprene or polybutadiene diene homopolymer. The living diene homopolymer thus obtained is subsequently used as initiator in the preparation of the diene elastomer in order to obtain a living block copolymer. The well-informed reader would understand that, during the second preparation stage, appropriate processing conditions have to be deployed in order to limit the formation of dead or deactivated polyisoprene or polybutadiene diene homopolymer which thus generates chains of low molecular weight. An amount of greater than 1% by weight of these polyisoprene or polybutadiene chains could be damaging to the properties of the functionalized diene elastomer according to the invention.

The living block copolymer resulting from the polymerization is subsequently functionalized in order to prepare the functionalized diene elastomer according to the invention.

According to a first alternative form of the preparation of the Functionalized diene elastomer present in the composition according to the invention, the functionalized diene elastomer a) and the optional star-branched diene elastomer c) are mixed in the proportions necessary to minimize the content of elastomer b).

The functionalized diene elastomer a) can be obtained, in a way known per se, by reaction of a tin derivative with the living diene elastomer resulting from the polymerization.

The optional star-branched elastomer c) can be obtained, in a way known per se, by reaction of a tin-comprising star-branching agent with the living diene elastomer resulting from the polymerization.

The mixing of the two elastomers can be carried out in an inert solvent, for example an aliphatic or alicyclic hydrocarbon, such as pentane, hexane, heptane, isooctane or cyclohexane, or an aromatic hydrocarbon, such as benzene, toluene or xylene, which can be the same as the polymerization solvent. The mixing is then carried out at a temperature preferably of between 20° C. and 120° C., preferably in the vicinity of 30° C. to 90° C.

According to a second alternative form of the preparation of the functionalized diene elastomer present in the composition according to the invention, in the case where the star-branched diene elastomer c) is present, the living diene elastomer resulting from the polymerization stage is subjected to the reaction of a star-branching agent and to the reaction of a functionalization agent.

Thus, for example, the functionalization of the living diene elastomer resulting from the polymerization stage can be carried out at a temperature varying from 30° C. to 120° C., in the presence, to begin with, of an appropriate amount of a star-branching agent in order to star-branch preferably from 5% to 45% by weight of the living elastomer. Then, subsequently, the remaining living chains of the diene elastomer obtained after the first stage are functionalized by addition of a tin functionalization agent capable of introducing a tin functional group at the chain end or in the middle of the chain. The functionalization reaction of the diene elastomer is subsequently stopped by the deactivation of the remaining living chains.

The well-informed reader would understand that, during the stages of preparation of the functionalized diene elastomers a) and c), in the case where the star-branched diene elastomer c) is present, appropriate processing conditions have to be deployed in order to limit the formation of the diene elastomer not functionalized by tin b).

The functionalized diene elastomer or elastomers generally represent from 30 to 100 phr of the composition.

As explained above, the composition according to the invention comprises, as predominant filler, one or more carbon blacks with a CTAB specific surface varying from 100 to 200 $m^2/g$, preferably from 120 to 180 $m^2/g$.

In the context of the present invention, the CTAB specific surface is determined according to Standard NFT 45-007 (November 1987, method B).

Above a CTAB specific surface of 200 $m^2/g$, the combination of the carbon black with a diene elastomer becomes disadvantageous to the hysteresis of the mixture and thus unacceptably disadvantageous to the rolling resistance of the tire.

All carbon blacks are suitable as carbon blacks, in particular blacks of the HAF, ISAF or SAF type conventionally used in tires ("tire-grade" blacks), the CTAB specific surface (determined according to French Standard NF T 45-007 of November 1987, method B) of which is greater than or equal to 100 $m^2/g$, which corresponds in particular to reinforcing carbon blacks, such as "CRX1346", or blacks of the 100 and 200 series (ASTM grades), such as, for example, the N115, N134, N220 and N234 blacks. More preferably, the carbon blacks will have a specific surface of at least 100 $m^2/g$ and of at most 200 $m^2/g$, particularly of at least 120 $m^2/g$ and of at most 180 $m^2/g$.

The carbon black or blacks with a CTAB specific surface varying from 100 to 200 $m^2/g$ generally represent at least 30 and at most 130 phr, preferably at most 100 phr. Preferably, this content is within a range extending from 30 to 90 phr, preferably from 30 to 70 phr, more preferably from 40 to 60 phr.

The composition according to the invention can also comprise, as non-predominant filler, one or more other reinforcing fillers other than carbon blacks with a CTAB specific surface varying from 100 to 200 $m^2/g$.

Use may be made, as non-predominant filler, of any type of reinforcing filler known for its abilities to reinforce a rubber composition which can be used in the manufacture of tires, for example a reinforcing organic filler, such as carbon black with a CTAB specific surface of less than 100 $m^2/g$.

Use may also be made, according to the applications targeted, of blacks of higher series FF, FEF, GPF or SRF, for example the N660, N683 or N772 blacks. The carbon blacks might, for example, be already incorporated in the isoprene elastomer in the form of a masterbatch (see, for example, Applications WO 97/36724 or WO 99/16600).

Other types of reinforcing filler can be used as a blend with carbon black, in particular other reinforcing organic fillers or reinforcing inorganic fillers.

Mention may be made, as examples of organic fillers other than carbon blacks, of functionalized polyvinylaromatic organic fillers, such as described in Applications WO-A-2006/069792 and WO-A-2006/069793.

The term "reinforcing inorganic filler" should be understood, in the present patent application, by definition, as meaning any inorganic or mineral filler, whatever its colour and its origin (natural or synthetic), also known as "white filler", "clear filler" or indeed even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

The physical state under which the reinforcing inorganic filler is provided is not important, whether it is in the form of a powder, of microbeads, of granules, of beads or any other appropriate densified form. Of course, the term "reinforcing inorganic filler" is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or fumed silica exhibiting a BET specific surface and a CTAB specific surface both of less than 450 $m^2/g$, preferably from 30 to 400 m²/g. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface as described in Application WO 03/16837.

When it is present in the composition, use may be made, in a known manner, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is made in particular of silane polysulphides, referred to as "symmetrical" or "unsymmetrical" depending on their specific structure, such as described, for example, in Applications WO 03/002648 (or U.S. 2005/016651) and WO 03/002649 (or U.S. 2005/016650).

Mention will more particularly be made, as examples of silane polysulphides, of bis(($C_1$-$C_4$)alkoxyl($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl) polysulphides. Use is in particular made, among these compounds, of bis(3-triethoxysilylpropyl) tetrasulphide, abbreviated to TESPT, of formula $[(C_2H_5O)_3Si(CH_2)_3S_2]_2$, or bis(triethoxysilylpropyl)disulphide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, such as described in Patent Application WO 02/083782 (or U.S. 2004/132880).

Mention will in particular be made, as coupling agent other than alkoxysilane polysulphide, of bifunctional POSs (polyorganosiloxanes), or else of hydroxysilane polysulphides (R2=OH in the above formula III), such as described, for example, in Patent Applications WO 02/30939 (or U.S. Pat. No. 6,774,255) and WO 02/31041 (or U.S. 2004/051210), or else of silanes or POSs bearing azodicarbonyl functional groups, such as described, for example, in Patent Applications WO 2006/125532, WO 2006/125533 and WO 2006/125534.

In the treads in accordance with the invention, the content of coupling agent is preferably between 0.3 and 12 phr, more preferably, according to the applications, between 0.5 and 3 phr or between 3 and 8 phr. However, it is generally desirable to use as little as possible of it. With respect to the weight of reinforcing inorganic filler, the content of coupling agent typically represents at least 0.5% by weight and at most 15% by weight, indeed even at most 12% by weight, with respect to the amount of inorganic filler.

A person skilled in the art will understand that a reinforcing filler of another nature, in particular organic nature, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer.

Preferably, the content of filler in the composition is at least 30 phr, more preferably at least 50 phr, and at most 150 phr, more preferably at most 120 phr. The optimum is different according to the specific applications targeted. A person skilled in the art in addition knows how to adjust the total content of total reinforcing filler (carbon black and reinforcing inorganic filler, such as silica) as a function, on the one hand, of the specific surface of this total content and, on the other hand, of the rolling resistance, wear and wet grip performance values which have to be achieved for the tire under consideration.

The composition according to the invention can also comprise at least one diene elastomer other than the said functionalized diene elastomer according to the invention This or these diene elastomers other than the functionalized diene elastomer according to the invention can be chosen from the diene elastomers conventionally used in tires, such as natural rubber or a synthetic elastomer, or also another functionalized or star-branched elastomer.

The composition according to the invention can also comprise a chemical crosslinking agent.

The chemical crosslinking makes possible the formation of covalent bonds between the elastomer chains. The chemical crosslinking can be carried out using a vulcanization system or else using peroxide compounds.

The vulcanization system proper is based on sulphur (or on a sulphur-donating agent) and on a primary vulcanization accelerator. Additional to this base vulcanization system are various known secondary vulcanization accelerators or vulcanization activators, such as zinc oxide, stearic acid or equivalent compounds, or guanidine derivatives (in particular diphenylguanidine), incorporated during the first non-productive phase and/or during the productive phase, as described subsequently.

The sulphur is used at a preferred content of between 0.5 and 12 phr, in particular between 1 and 10 phr. The primary vulcanization accelerator is used at a preferred content of between 0.5 and 10 phr, more preferably of between 0.5 and 5.0 phr.

Use may be made, as (primary or secondary) accelerator, of any compound capable of acting as accelerator for the vulcanization of diene elastomers in the presence of sulphur, in particular accelerators of the thiazole type, and also their derivatives, and accelerators of thiuram and zinc dithiocarbamate types. These accelerators are, for example, chosen from the group consisting of 2-mercaptobenzothiazyl disulphide (abbreviated to "MBTS"), tetrabenzylthiuram disulphide ("TBZTD"), N-cyclohexyl-2-benzothiazolesulphenamide ("CBS"), N,N-dicyclohexyl-2-benzothiazolesulphenamide ("DCBS"), N-(tert-butyl)-2-benzothiazolesulphenamide ("TBBS"), N-(tert-butyl)-2-benzothiazolesulphenimide ("TBSI"), zinc dibenzyldithiocarbamate ("ZBEC") and the mixtures of these compounds.

Preferably, use is made of a primary accelerator of the sulphenamide type.

When the chemical crosslinking is carried out using one or more peroxide compounds, the said peroxide compound or compounds represent from 0.01 to 10 phr.

Mention may be made, as peroxide compounds which can be used as chemical crosslinking system, of acyl peroxides, for example benzoyl peroxide or p-chlorobenzoyl peroxide, ketone peroxides, for example methyl ethyl ketone peroxide, peroxyesters, for example t-butyl peroxyacetate, t-butyl peroxybenzoate and t-butyl peroxyphthalate, alkyl peroxides, for example dicumyl peroxide, di(t-butyl) peroxybenzoate and 1,3-bis(t-butylperoxyisopropyl)benzene, or hydroperoxides, for example t-butyl hydroperoxide.

The rubber composition according to the invention can also comprise all or a portion of the usual additives generally used in elastomer compositions intended for the manufacture of tires, in particular of treads, such as, for example, plasticizers or extending oils, whether the latter are of aromatic or non-aromatic nature, pigments, protection agents, such as antiozone waxes (such as Cire Ozone C32 ST), chemical antiozonants or antioxidants (such as 6-PPD), antifatigue agents, reinforcing resins, methylene acceptors (for example, phenolic novolak resin) or methylene donors (for example, HMT or H3M), as described, for example, in Application WO 02/10269, or adhesion promoters (cobalt salts, for example).

Preferably, the composition according to the invention comprises, as preferred non-aromatic or very weakly aromatic plasticizing agent, at least one compound chosen from the group consisting of naphthenic oils, paraffinic oils, MES oils, TDAE oils, glycerol esters (in particular trioleates), plasticizing hydrocarbon resins exhibiting a high Tg preferably of greater than 30° C., and mixtures of such compounds.

The composition according to the invention can also comprise, in addition to the coupling agents, activators of the coupling of the reinforcing inorganic filler or more generally processing aids capable, in a known way, by virtue of an improvement in the dispersion of the inorganic filler in the rubber matrix and of a lowering in the viscosity of the compositions, of improving their ease of processing in the raw state, these processing aids being, for example, hydrolysable silanes, such as alkylalkoxysilanes (in particular alkyltriethoxysilanes), polyols, polyethers (for example, polyethylene glycols), primary, secondary or tertiary amines (for example, trialkanolamines), hydroxylated or hydrolysable POSs, for example α,ω-dihydroxypolyorganosiloxanes (in particular α,ω-dihydroxypolydimethylsiloxanes), or fatty acids, such as, for example, stearic acid.

The composition according to the invention is manufactured in an appropriate mixer, using two successive phases of preparation which are well known to a person skilled in the art: a first phase of thermomechanical working or kneading (sometimes referred to as "non-productive" phase) at high temperature, up to a maximum temperature (denoted Tmax) of between 100° C. and 190° C., preferably between 130° C. and 180° C., followed by a second phase of mechanical working (sometimes referred to as "productive" phase) at lower temperature, typically below 110° C., for example between 60° C. and 100° C., during which finishing phase the chemical crosslinking agent is incorporated; such phases have been described in Applications EP-A-0 501 227, EP-A-0 735 088, EP-A-0 810 258, WO00/05300 or WO00/05301.

In the process in accordance with the invention, the first (non-productive) phase is preferably carried out in two thermomechanical stages. During the first stage, all the necessary base constituents, with the exception of the chemical crosslinking agent, are introduced into an appropriate mixer, such as a normal internal mixer. This first stage is carried out at a temperature of between 110° C. and 190° C. and preferably between 130° C. and 180° C. The total duration of kneading is preferably between 2 and 5 minutes.

After cooling the mixture thus obtained, the chemical crosslinking agent is then incorporated at low temperature, generally in an external mixer, such as an open mill; the combined mixture is then mixed (productive phase) for a few minutes, for example between 5 and 15 minutes.

The final composition thus obtained is subsequently calendered, for example in the form of a sheet or plaque, in particular for laboratory characterization, or else extruded, in order to form, for example, a rubber profiled element used in the manufacture of semi-finished products, such as treads.

The vulcanization (or curing) is carried out in a known way at a temperature generally of between 130° C. and 200° C., under pressure, for a sufficient time which can vary, for example, between 5 and 90 minutes, as a function in particular of the curing temperature, of the vulcanization system adopted, of the kinetics of vulcanization of the composition under consideration or of the size of the tire.

A further subject-matter of the invention is a semi-finished article made of rubber for a tire, comprising the rubber composition according to the invention. Preferably, the said article is a tread.

A final subject-matter of the invention is a tire comprising a semi-finished article according to the invention.

The present invention is illustrated by the following examples.

Examples

The object of this example is to compare the processing properties and the dynamic properties of different rubber compositions and also the tire performances of treads obtained from these rubber compositions.

The composition A0 is a control composition.

The compositions A2 and A5 are comparative compositions.

The compositions A1, A3, A4, A6 and A7 are compositions according to the invention.

The compositions A0, A2 and A5 comprise 85 phr of standard SBR and differ in the content and fineness of carbon black:

A0 comprises 56.5 phr of N234 (CTAB specific surface=120 $m^2/g$)

A2 comprises 56.5 phr of N134 (CTAB specific surface=135 $m^2/g$)

A5 comprises 54 phr of CRX1346 (CTAB specific surface=160 $m^2/g$)

The compositions A1, A3 and A6 comprise 85 phr of SBR having a low polydispersity index in accordance with the invention and differ in the content and fineness of the carbon black:

A1 comprises 56.5 phr of N234 (CTAB specific surface=120 $m^2/g$)

A3 comprises 56.5 phr of N134 (CTAB specific surface=135 $m^2/g$)

A6 comprises 54 phr of CRX1346 (CTAB specific surface=160 $m^2/g$)

The compositions A4 and A7 comprise 85 phr of SBR having polyisoprene blocks having a low polydispersity index in accordance with the invention and differ in the content and fineness of the carbon black:

A4 comprises 56.5 phr of N134 (CTAB specific surface=135 $m^2/g$)

A7 comprises 54 phr of CRX1346 (CTAB specific surface=160 $m^2/g$)

For all of these rubber compositions, the content of carbon black has been adjusted so that they have the same peak-to-peak G*50% rigidity (shearing dynamic property), as measured according to Standard ASTM D2231-71.

The formulations of the rubber compositions are given in Table 1. The amounts are expressed in parts per 100 parts by weight of elastomer (phr).

TABLE 1

| | Composition | | | | | | | |
|---|---|---|---|---|---|---|---|---|
| | A0 | A1 | A2 | A3 | A4 | A5 | A6 | A7 |
| NR (1) | 15 | 15 | 15 | 15 | 15 | 15 | 15 | 15 |
| SBR (2) | 85 | | 85 | | | 85 | | |
| SBR (3) | | 85 | | 85 | | | 85 | |
| SBR (4) | | | | | 85 | | | 85 |
| Carbon black N234 | 56.5 | 56.5 | | | | | | |
| Carbon black N134 | | | 56.5 | 56.5 | 56.5 | | | |
| Carbon black CRX1346 | | | | | | 54 | 54 | 54 |
| Paraffin | 1 | 1 | 1 | 1 | 1 | 1 | 1 | 1 |
| Antioxidant (5) | 2 | 2 | 2 | 2 | 2 | 2 | 2 | 2 |
| Stearic acid | 2 | 2 | 2 | 2 | 2 | 2 | 2 | 2 |
| ZnO | 2.7 | 2.7 | 2.7 | 2.7 | 2.7 | 2.7 | 2.7 | 2.7 |
| Sulphur | 1.1 | 1.1 | 1.1 | 1.1 | 1.1 | 1.1 | 1.1 | 1.1 |
| Accelerator (6) | 1.1 | 1.1 | 1.1 | 1.1 | 1.1 | 1.1 | 1.1 | 1.1 |

(1) NR: natural rubber (plasticized, peptized)
(2) tin-functional SBR having a high polydispersity index: styrene/butadiene copolymer with the following contents by weight: 50% of trans-1,4-BR; 26% of cis-1,4-BR; 24% of 1,2-BR; 26.5% of styrene (Tg = −48° C.). The Mn molecular weight of this polymer, determined by the SEC technique, is 145 000 g · mol$^{-1}$ and the PI is 1.7.
(3) SBR coupled by tin having a low polydispersity index, in accordance with the invention: styrene/butadiene copolymer with the following contents by weight: 45.0% of trans-1,4-BR; 30.3% of cis-1,4-BR; 24.8% of 1,2-BR; 28.2% of styrene (Tg = −49° C.). The Mn molecular weight of this polymer, determined by the SEC technique, is 178 900 g · mol$^{-1}$ and the PI is 1.25.
(4) SBR coupled by tin having polyisoprene blocks, having a low polydispersity index, in accordance with the invention: styrene/butadiene copolymer with the following contents by weight: 46.6% of trans-1,4-BR; 27.7% of cis-1,4-BR; 25.7% of 1,2-BR; 28.7% of styrene (Tg = −48° C.). The PI/SBIR ratio is 10.5%. The Mn molecular weight of this polymer, determined by the SEC technique, is 169 000 g · mol$^{-1}$ and the PI is 1.26.
(5) N-(1,3-dimethylbutyl)-N-phenyl-para-phenylenediamine (6-PPD)
(6) N-cyclohexyl-2-benzothiazolesulphenamide (CBS)

The rubber compositions are characterized by the following measurements:

The Mooney viscosity ML(1+4) at 100° C. is measured according to Standard ASTM: D-1646.

The dynamic properties ΔG* and tan(δ)max are measured on a viscosity analyser (Metravib VA4000) according to Standard ASTM D 5992-96. The response is recorded of a sample of vulcanized composition (cylindrical test specimen with a thickness of 2 mm and a cross section of 79 mm$^2$), subjected to a simple alternating sinusoidal shear stress, at a frequency of 10 Hz, under standard temperature conditions (60° C.) according to Standard ASTM D 1349-99. A peak-to-peak strain amplitude sweep is carried out from 0.1% to 100% (outward cycle) and then from 100% to 0.1% (return cycle). The results made use of are the complex dynamic shear modulus (G*) and the loss factor tan δ.

The hysteresis (tan δ max) is expressed by the measurement of tan delta at 7% strain according to Standard ASTM D2231-71.

The treads were manufactured from the rubber compositions summarized in Table 1, in accordance with the process described in detail in the description.

The wear tests were carried out for tires having the dimensions 315/70R22.5 XZE2 fitted to the front position of a lorry of towing type. The wear rolling is carried out over a distance of 60 000 km. The wear performance, expressed on the basis of the control at 100, is calculated by the ratio of the mean loss in height, measured for the two tires of the control composition A0, to the mean loss in height for the two tires of the composition An (0≤n≤7).

The rolling resistance measurement is carried out according to Standard ISO 9948, applicable to the tires for vans and heavy-duty vehicles. The tire is run on a large-diameter rolling drum driven by a motor. The method consists in measuring the deceleration of the system in the vicinity of 80 km/h in order to deduce the rolling resistance therefrom.

The rolling resistance, expressed on the basis of the control at 100, is expressed as the ratio of the rolling resistance force of the control tire, composed of the composition A0, to the rolling resistance force of the tire composed of the composition An (1≤n≤7). The rolling resistance force is deduced from the overall braking force measured, from which the retarding force of the free tire and the retarding force of the free rolling drum are subtracted.

The results obtained are presented in the following Table 2, in relative units for the tire performances. A value of greater than 100 indicates an improved tire performance result. A decrease in the Mooney plasticity value indicates an improvement in the processing.

TABLE 2

| | Composition | | | | | | | |
|---|---|---|---|---|---|---|---|---|
| | A0 | A1 | A2 | A3 | A4 | A5 | A6 | A7 |
| Properties in the non-vulcanized state | | | | | | | | |
| Mooney plasticity ML (1 + 4) | 128 | 110 | 131 | 112 | 115 | 136 | 117 | 121 |
| Dynamic properties as a function of the strain | | | | | | | | |
| G * 50% pp, 60° C. (outward curve) | 2.18 | 2.12 | 2.20 | 2.13 | 2.13 | 2.21 | 2.14 | 2.15 |

TABLE 2-continued

| | Composition | | | | | | | |
|---|---|---|---|---|---|---|---|---|
| | A0 | A1 | A2 | A3 | A4 | A5 | A6 | A7 |
| Tan delta max 60° C. (outward curve) Tire performances | 0.204 | 0.182 | 0.207 | 0.184 | 0.168 | 0.213 | 0.190 | 0.175 |
| Wear | 100 | 100 | 105 | 105 | 105 | 108 | 108 | 108 |
| Rolling resistance | 100 | 104 | 98 | 103 | 106 | 97 | 100 | 105 |

The comparison between the compositions A0 and A1 demonstrates the known fact that the use of an SBR having a low polydispersity index as a replacement for an SBR having a high polydispersity index improves the processing (decrease in the Mooney plasticity) and the rolling resistance, without having a disadvantageous effect on the wear.

The comparison between the compositions A0, A2 and A5 demonstrates the known fact that the increase in the specific surface of the carbon blacks improves the wear resistance of the tires but is accompanied by an unacceptable increase in the Mooney plasticity and by an unacceptable disadvantageous effect on the rolling resistance (A2 and A5).

It is found that the compositions A3, A4, A6 and A7 in accordance with the invention (combination of an elastomer having a low polydispersity index and of a carbon black with a specific surface of greater than or equal to 120 m²/g) exhibit a significant improvement in the wear and in the rolling resistance (A3, A4 and A7) without having a disadvantageous effect on the processing (Mooney plasticity), in comparison with the performances of the control composition A0.

In conclusion, the combination of a diene elastomer, of a diene elastomer characterized by an Mw/Mn ratio of between 1.2 and 1.5 and of a carbon black with a CTAB specific surface of between 100 and 200 m²/g makes it possible to improve the wear and the rolling resistance of the tire without having a disadvantageous effect on the processing of the mixture, which constitutes a novelty.

The invention claimed is:

1. A rubber composition based on one or more functionalized diene elastomers and, as predominant filler, on one or more carbon blacks with a CTAB specific surface varying from 100 to 200 m²/g, the functionalized diene elastomer or elastomers being composed:
a) of a diene elastomer functionalized, in the middle of the chain, by a tin functional group and corresponding to the following formula:

[A]$_n$-X-[A]$_m$ where n and m are integers of greater than 0, such that n+m=2,
b) of a content of less than 15% by weight, with respect to the total weight of the functionalized diene elastomer, of a non-tin-functional elastomer corresponding to the following formula:

[A]

where:
A is a diene elastomer, the A blocks being identical to one another,
X is a tin-comprising group, the elastomer A exhibits a monomodal distribution of molecular weights before optional functionalization and a polydispersity index before optional functionalization of less than or equal to 1.3.

2. The composition according to claim 1, wherein the functionalized diene elastomer further comprises a diene elastomer star-branched by tin c) corresponding to the following formula:

[A]$_o$-Y-[A]$_p$ where:

o and p are integers of greater than or equal to 0 and such that o+p≥3 and o+p≤6,
A is the diene elastomer as defined in claim 1, it being understood that it exhibits a monomodal distribution of molecular weights before star-branching and a polydispersity index before star-branching of less than or equal to 1.3,
Y is a tin-comprising group.

3. The composition according to claim 2, wherein the functionalized diene elastomer comprises from 5% to 45% by weight, with respect to the total weight of the functionalized diene elastomer, of the elastomer star-branched by tin c).

4. The composition according to claim 1, wherein the functionalized diene elastomer comprises a content strictly of greater than 0% by weight and of less than 10% by weight, with respect to the total weight of the functionalized diene elastomer, of the non-tin-functional elastomer b).

5. The composition according to claim 1, wherein the functionalization of the diene elastomer a) is obtained with a dihalotin functionalization agent.

6. The composition according to claim 2, wherein the star-branching of the diene elastomer star-branched by tin c) is obtained with a tri- or tetrahalotin star-branching agent.

7. The composition according to claim 2, wherein the diene elastomer star-branched by tin c) is a star-branched elastomer having 4 branches.

8. The composition according to claim 1, wherein the diene elastomer is selected from the group consisting of polybutadienes, random or block butadiene/styrene copolymers, random or block butadiene/isoprene copolymers, random or block butadiene/styrene/isoprene copolymers, random or block styrene/isoprene copolymers and synthetic polyisoprene.

9. The composition according to claim 1, wherein the diene elastomer [A]- corresponds to the following formula:

[B-C]- where:
the B block is composed of a polyisoprene or of a polybutadiene, the C block is composed of a diene elastomer, the molar content of units resulting from conjugated dienes of which is greater than 15%, the number-average molecular weight Mn1 of the B block varies from 2,500 to 20,000 g/mol, the number-average molecular weight Mn2 of the C block varies from 80,000 to 350,000 g/mol, the content of 1,2 linkages in the B block is between 1% and 20% in the case where B is a polybutadiene block, the content of 3,4 linkages in each B block is between 1% and 25% in the case where B is a polyisoprene block, the B-C copolymer exhibits a monomodal distribution of molecular weights before optional functionalization or optional star-branching and a polydispersity index before optional functionalization or optional star-branching of less than or equal to 1.3.

10. The composition according to claim 9, wherein the number-average molecular weight Mn1 of each end polybutadiene or polyisoprene B block is from 5% to 20% of the number-average molecular weight Mn2 of each of the C blocks.

11. The composition according to claim 9, wherein the C block is selected from the group consisting of copolymers of styrene and butadiene, copolymers of styrene and isoprene, copolymers of butadiene and isoprene, styrene/butadiene/isoprene copolymers, polyisoprene when the neighbouring B block is a polybutadiene and polybutadiene when the neighbouring B block is a polyisoprene.

12. The composition according to claim 1, wherein the diene elastomer a) comprises an amine functional group at one or all of the ends of chains not functionalized by tin.

13. The composition according to claim 1, wherein the diene elastomer b) comprises an amine functional group at one of the ends of the chains.

14. The composition according to claim 2, wherein the diene elastomer star-branched by tin c) comprises an amine functional group at the ends of chains not star-branched by tin.

15. The composition according to claim 1, wherein the functionalized diene elastomer or elastomers represent from 30 to 100 phr of the composition.

16. The composition according to claim 1, wherein the carbon black or blacks with a CTAB specific surface varying from 100 to 200 $m^2/g$ represent from 30 to 100 phr.

17. The composition according to claim 1, wherein it further comprises a chemical crosslinking agent.

18. A semi-finished article made of rubber for a tire, comprising a rubber composition as defined in claim 1.

19. A semi-finished article according to claim 18, wherein the article is a tread.

20. A tire, wherein the tire comprises a semi-finished article as defined in claim 18.

* * * * *